UNITED STATES PATENT OFFICE.

WILLIS R. WHITNEY, OF SCHENECTADY, NEW YORK, ASSIGNOR TO GENERAL ELECTRIC COMPANY, A CORPORATION OF NEW YORK.

PURIFICATION OF ASBESTOS.

1,031,498.     Specification of Letters Patent.     Patented July 2, 1912.

No Drawing.     Application filed April 29, 1911. Serial No. 624,190.

*To all whom it may concern:*

Be it known that I, WILLIS R. WHITNEY, a citizen of the United States, residing at Schenectady, in the county of Schenectady, State of New York, have invented certain new and useful Improvements in Purification of Asbestos, of which the following is a specification.

Commercial asbestos, whether hydrated or unhydrated, is commonly associated with particles of magnetite which are so small and so adherent to the fibers of the asbestos as to make their removal by mechanical means impracticable. Magnetite is insoluble in dilute acids, and it is, therefore, impossible to remove it from the asbestos by chemical treatment without damage to the asbestos fiber itself.

I have discovered that the magnetite particles may be reduced to a soluble product, which I believe to be iron, at a temperature which will leave the asbestos fiber entirely undamaged and of undiminished mechanical strength. The reduction product may then be easily removed from the asbestos itself by treatment with dilute acid or other solvent, which is chemically inactive with respect to the asbestos.

My invention may be carried out by placing the asbestos, either as loose fibers, or as sheets or other coherent form, in an appropriate heating chamber in which the temperature can be readily controlled and there maintaining it at a temperature of 370° to 420° C. for about 20 to 24 hours while passing a slow stream of hydrogen, carbon monoxid or other reducing gas through the chamber. The particular temperature employed will vary somewhat with the materials and with the length of time employed for reduction, the lower temperatures requiring a longer treatment. I find that a temperature somewhere in the neighborhood of 390° to 400° C. is preferable for carrying out the process. At temperatures very much higher than this, the asbestos fiber becomes somewhat weakened mechanically. After this treatment, the fiber is treated with dilute sulfuric or hydrochloric acid, or in fact any weak solvent for the reduction product which in my opinion is largely metallic iron, although it is difficult accurately to determine its composition because of its extremely fine state of division throughout the asbestos. The action of the acid is accompanied by the evolution of hydrogen, together with some hydrogen sulfid. After removal of the iron, the asbestos is simply washed and dried. Asbestos which has been subjected to this purifying treatment has an increased electrical resistance and is therefore rendered more valuable for purposes of electrical insulation.

What I claim as new, and desire to secure by Letters Patent of the United States, is:—

1. The process which consists in subjecting commercial asbestos containing a relatively insoluble compound as an impurity to the action of a reducing agent for said compound at a reducing temperature below 420° C., thereby reducing said compound to a soluble state, and then treating the impure asbestos with a solvent for said reduction product.

2. The process which consists in subjecting commercial asbestos containing magnetite to the action of a reducing gas at a temperature of 370° to 420° C., thereby reducing the magnetite to form a soluble reduction product, and then treating the mass with a solvent for said reduction product.

3. The process which consists in subjecting asbestos containing particles of iron oxid as an impurity to an elevated temperature below 420° C. in the presence of a reducing gas, thereby reducing the oxid to metallic iron, and finally treating with a dilute acid to dissolve said metallic iron.

4. The process of purifying asbestos containing admixed particles of iron oxid, which consists in subjecting the impure asbestos to the reducing action of hydrogen at a temperature of 370°–420° C., thereby reducing the iron oxid to the state of metallic iron, and then removing said iron by solution with dilute acid.

5. The process of purifying commercial grades of asbestos containing particles of magnetite, which consists in heating said impure asbestos at a temperature of about 390° to 400° C. in a hydrogen atmosphere, thereby reducing the magnetite, treating with dilute acid to dissolve the reduction product and finally washing with water.

6. The process of purifying commercial asbestos containing magnetite as an impurity which consists in subjecting said impure asbestos to the action of a reducing gas at a temperature materially below bright redness thereby reducing the magnetite and then removing said reduction product with a solvent inert with respect to asbestos.

In witness whereof, I have hereunto set my hand this 28th day of April, 1911.

WILLIS R. WHITNEY.

Witnesses:
BENJAMIN B. HULL,
HELEN ORFORD.